Figure 1:
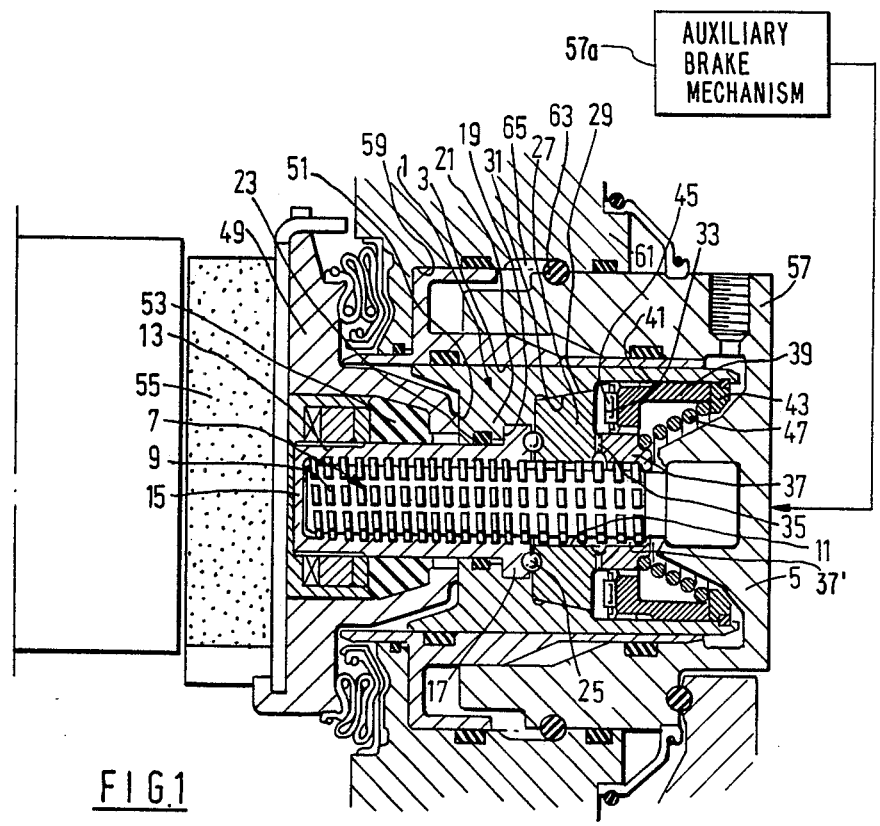

United States Patent [19]

Harrison

[11] Patent Number: 4,809,819
[45] Date of Patent: Mar. 7, 1989

[54] BRAKE ACTUATORS

[75] Inventor: Anthony W. Harrison, Selly Oak, England

[73] Assignee: Lucas Industries public limited company, Birmingham, England

[21] Appl. No.: 203,618

[22] Filed: Jun. 6, 1988

Related U.S. Application Data

[63] Continuation of Ser. No. 14,533, Feb. 13, 1987.

[30] Foreign Application Priority Data

Feb. 28, 1986 [GB] United Kingdom ............... 8605092

[51] Int. Cl.4 ............................................. F16D 65/56
[52] U.S. Cl. .............................. 188/719; 188/196 D; 192/111 A
[58] Field of Search ................... 188/719, 196 D, 199, 188/202, 203; 192/111 A

[56] References Cited

U.S. PATENT DOCUMENTS

| | | | |
|---|---|---|---|
| 3,768,601 | 10/1973 | Bejot | 188/71.9 |
| 3,885,653 | 5/1975 | Farr | 188/196 D |
| 4,637,498 | 1/1987 | Thompson et al. | 188/71.9 |
| 4,678,065 | 7/1987 | Erben et al. | 188/196 D |

FOREIGN PATENT DOCUMENTS

| | | | |
|---|---|---|---|
| 1434369 | 5/1976 | United Kingdom | 188/71.9 |
| 2035485 | 6/1980 | United Kingdom | 188/71.9 |

Primary Examiner—George E. A. Halvosa
Attorney, Agent, or Firm—Scrivener and Clarke

[57] ABSTRACT

The present specification discloses an actuator for use in a vehicle brake. The actuator incorporates an adjuster which automatically provides an adjustment to take account of pad lining wear, to thus maintain a substantially constant brake clearance. The brake actuator of the present invention comprises a hollow piston which is axially slidably located in a cylinder with an elongate shaft extending axially through said cylinder and said hollow piston. Said shaft is fixed in a position within the cylinder and carries a spiral thread and axially extending splines. An adjuster nut is rotatably mounted on said spiral thread and is engaged by detent means mounted on said axial splines. Said detent means are spring biassed against the adjuster nut by a spring which engages said piston.

The present invention thus provides a brake actuator with an adjuster nut located within the actuator piston, wherein the piston is positively returned after brake release and vibration cannot produce any unrequired adjustment of the adjuster nut.

25 Claims, 1 Drawing Sheet

BRAKE ACTUATORS

This application is a continuation, of application Ser. No. 014,533, filed Feb. 13, 1987.

The present invention relates to an actuator for use in a vehicle brake.

In particular, the present invention relates to a brake actuator incorporating an adjuster which automatically provides an adjustment to take account of pad lining wear, to thus maintain a substantially constant brake clearance. In certain known brake actuators the adjuster includes a nut which is mounted on a threaded shaft within a piston which is axially movable under hydraulic pressure to apply the brake. In such actuators the piston returns on brake release under the effect of compressed rubber seals, dust covers etc., to approximately provide the required brake clearance. However, with age and wear the piston may not be returned satisfactorily so that the pad/lining can remain in contact with the braking surface. Clearly this is undesirable. Further, the adjuster nut may be moved on the threaded shaft by vibration or shock providing an unrequired adjustment which may lead to the brakes binding-on.

The aim of the present invention is to provide a brake actuator with an adjuster nut located within the actuator piston, wherein the piston is positively returned after brake release and vibration cannot produce any unrequired adjustment of the adjuster nut.

According to the present invention there is provided a brake actuator comprising a hollow piston which is axially slidably located in a cylinder with an elongate shaft extending axially through said cylinder and said hollow piston, said shaft being fixed in position within the cylinder and carrying a spiral thread and axially extending first splines, an adjuster nut being rotatably mounted on said spiral thread and being engaged by detent means having axial second splines complementary and engaged with said axial first splines, said detent means being spring biassed agianst the adjuster nut by a spring which engages said piston, and a thrust ring carried by said detent means, being axially movable relative to the hollow piston between the adjuster nut and retaining means provided in the piston, under the effect of hydraulic pressure.

In a preferred embodiment of the present invention said detent means is in the form of a ring having sloping teeth which interengage with similar teeth on the adjuster nut, the ring being located on the axial splines of the threaded shaft so that it cannot rotate relative to the shaft. The outer periphery of the detent ring also carries axial splines which interengage with complementary axial splines on the inside surface of the thrust ring; the outer periphery of the thrust ring carrying axial splines which mesh with complementary axial splines on the inside wall of the hollow piston. Said thrust ring is axially movable relative to the piston between the adjuster nut and retaining means in the form of a ring secured to the inside wall of the piston, under the effect of hydraulic pressure within said cylinder, and has a thrust bearing which can engage an axial face of the adjuster nut.

In the normal adjusted brakes-off position, the adjuster nut engages against a shoulder which projects radially inwardly from the inside wall of the piston. When the normal service brake is to be applied, hydraulic pressure is applied within the cylinder forcing the piston along the cylinder to apply pressure to the friction pads. As the piston is moved axially, the said spring which engages between the detent ring and said retaining ring, is compressed, as it is insufficient to cause the adjuster nut to rotate on the spiral thread. The adjuster nut thus lifts off the radial shoulder inside the piston and maintains its position, the interengagement between the teeth on the adjuster nut and the detent ring preventing the adjuster nut from being rotated, i.e. adjusted, by any vibration or shock. When the service brake is released, the spring thus returns the piston back along the cylinder, positively providing the required brake clearance.

If and when pad wear occurs so that pad clearance is greater than required, the piston has to be moved further to apply the service brake. In such a case, the thrust bearing on the thrust ring engages the adjuster nut with the piston via the retaining ring, applying axial pressure on the adjuster nut sufficient to rotate the adjuster nut on the spiral thread overcoming the spring biased detent means. When the pads engage the braking surface the adjuster nut is rotated no further, and when the service brake is released the piston is returned under the action of the spring to the adjusted position where the piston shoulder engages the adjuster nut. The required brake clearance is thus restored.

Preferably, the cylinder of the present invention is formed within a further piston, the cylinder being closed at one axial end and open at the other. This further piston is axially movable within limits by a parking or auxiliary brake mechanism. In this case the outer periphery of the adjuster nut has a frusto-conical configuration which can engage a complementary clutch surface on the inside wall of the said piston to lock the parts together when the parking brake is operated.

Preferably, the interior of the said hollow piston is sealed to the outside of the cylinder by means of an axially movable setting tube which can be manually moved to lift the adjuster nut and wind the adjuster back against the detent ring and its spring bias. Preferably, a spreader plate is resiliently mounted on the setting tube between the piston and pad, the resilient mounting allowing for a degree of articulation for the spreader plate and at least reducing any pad drag which might be transferred to the piston.

Figure 2:
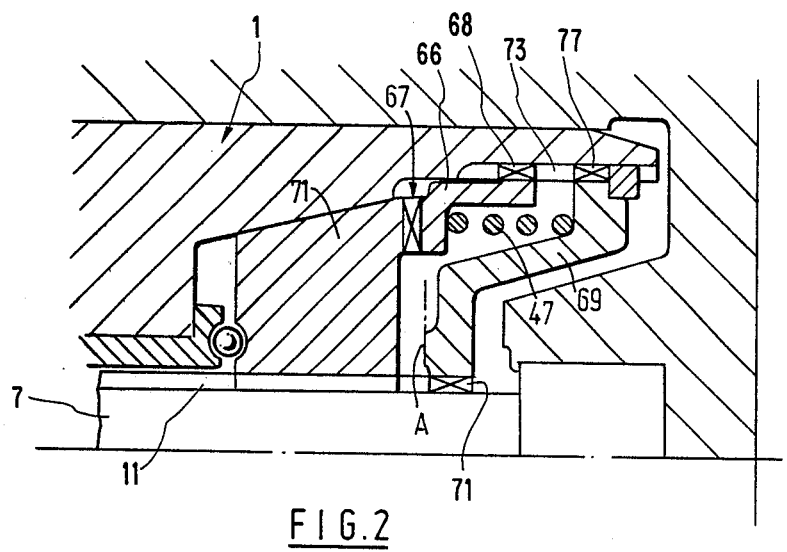

The present invention will now be further described, by way of example, with reference to the accompanying drawings, in which:

FIG. 1 is an axial cross-sectional view of a preferred embodiment of the present invention; and FIG. 2 is an enlarged cross-sectional view of a modified part of the embodiment of FIG. 1.

The brake actuator constructed according to the present invention and illustrated in FIG. 1 of the accompanying drawings, comprises a hollow piston 1 which is axially slidably located within a cylinder 3 which is open at one end and closed at the other end 5. Coaxially mounted within the cylinder 3 on said closed end 5 is an elongated shaft 7 which carries a spiral thread 9 and axial first splines 11, the shaft 7 extending through the hollow piston 1 and into a setting tube 13 which seals the interior of the hollow piston 1 to the outside of the cylinder 3. The setting tube 13 is an elongated hollow member closed at one end 15 and open at the other end. The open end of the setting tube 13 has a radially outwardly extending flange 17 which engages in an annular recess 19 formed in a radially inwardly extending shoulder 21 provided on the inside wall of the hollow piston 1. A seal 23 set in said shoulder 21 sealingly engages the setting tube 13 allowing for axial movement thereof.

Normally in a brakes-off, fully adjusted position, thrust bearings 25 provided in flange 17 engage with axial clearance one axial end face of an adjuster nut 27 which is carried on the shaft 7 by the spiral thread 9. In this brakes off position a frusto-conical clutch surface 29 provided on the outer periphery of the adjuster nut 27 engages with a complementary clutch surface 31 provided on the inside wall of the hollow piston 1. The other axial end face 33 of the adjuster nut 27 carries a ring of sloping teeth 35 which interengage with complementary teeth on a detent ring 37 having axial second splines 37' and which are complementary and engaged with the said axial first splines 11. The outer periphery of the detent ring 37 is also splined and meshes with axial splines on the inside surface of a thrust ring 39; the thrust ring 39 being carried in axial splines 41 on the inside wall of the hollow piston 1. Axial movmeent of the thrust ring 39 is limited by a retaining ring 43 secured to the inside wall of the hollow piston 1 and by the adjuster nut 27 against which a thrust bearing 45 carried by the thrust ring 39 can engage. A spring 47 engages between the retaining ring 43 and the detent ring 37 to hold the teeth on the detent ring 37 and on the adjuster nut 27, in mesh.

A spreader plate 49 engages as at 51 with the piston 1, the spreader plate 49 being mounted on the setting tube 13 by a resilient ring 53 which allows for articulation without the transfer of pad drag forces to the piston 1, the spreader plate 49 supporting the friction pad 55.

The cylinder 3 is formed in a further piston 57 which is axially movable in a bore 59 in an actuator housing 61. This further piston 57a is movable by a parking or auxiliary brake mechanism 57 between limits defined by a circlip 63 which is located in an annular groove formed in the outer periphery of the said further piston 57, and a large annular groove 65 in the wall of the bore 59 into which the circlip 63 projects.

In operation with the parking brake off, the circlip 63 engages against the right-hand axial end (as viewed in FIG. 1) of the annular groove 65. With normal service brake operation when the actuator is fully adjusted, the hydraulic pressure is increased in the cylinder 3, thus moving the hollow piston 1 and thrust ring 39 to the left in FIG. 1. The spreader plate 49 and friction pad 55 are thus also moved to the left until the friction pad 55 contacts the braking surface. As the hollow piston 1 is moved to the left in FIG. 1, the clutch face 31 is lifted off the adjuster nut 27, the force of the spring 47 producing an axial load in both the teeth 35 and spiral thread 9, which axial load is always reacted by the teeth 35 by the suitable selection of thread and tooth angles, so that adjuster nut 27 remains satisfactory. When the service brake is released, hydraulic pressure is released and the spring 47 moves the piston 1 positively back to a brakes-off position, thus ensuring that the required brake clearance is achieved.

If, however, an amount of pad wear has occurred over a predetermined level, the hollow piston 1 has to move further to the left in FIG. 1 to apply the brake so that thrust ring 39, or rather thrust bearing 45 carried thereby, contacts the adjuster nut 27. The axial load applied via the thrust bearing 45 loads the spiral thread 9 axially without a corresponding axial force being applied to the teeth 35, and the extra torque due to this axial load causes the adjuster nut 27 to rotate on the spiral thread 9; the meshed detent teeth on the adjuster nut 27 and detent ring 37 jumping over each other as the spring 47 is compressed and released as the adjuster nut 27 is rotated. Thus, the adjuster nut 27 then follows the said shoulder 21 at a predetermined distance. When the service brake is released the hollow piston 1 is moved to the right in FIG. 1 under the action of spring 47, until clutch face 31 engages the adjuster nut 27; adjuster nut 27 maintaining its adjusted position on spiral thread 9.

To return the hollow piston 1 to its original unadjusted position when, for example, the pads are to be replaced, the setting tube 13 is manually moved axially (to the right in FIG. 1) to move the adjuster nut 27 back along the spiral thread 9, spiral 47 moving the piston 1 back as there is no hydraulic pressure in cylinder 3.

When the parking or auxiliary brake mechanism 57a is actuated, said further piston 57 is moved to the left in FIG. 1 causing the threaded shaft 7 to move to the left, the spiral thread 9 transferring the braking force from the threaded shaft 7 to the adjuster nut 27 which cannot rotate due to its contact with clutch surface 31, whereby the braking force is transferred to the hollow piston 1 and the spreader plate 49. The adjuster is therefore locked during parking/auxiliary brake operation.

In a modificatoin as shown in FIG. 2, the detent ring 66 has meshing detent teeth 67 which have been moved radially outwards in comparison to the embodiment of FIG. 1, and the engagement area A between the thrust ring 69 and the adjuster nut 71 having been moved radially inwardly. By virtue of this modification no anti-friction thrust bearing is required between the thrust spring 69 and the adjuster nut 71 as the moment is reduced.

The periphery of the detent ring 66 carries axial second splines 68 and the inside surface of the thrust ring 69 carries axial third splines 71 complementary and interengaged with the first splines 11 carried by the shaft 7. Axial fourth splines 73 are carried on the inside wall of the hollow piston 1, the fourth splines 73 being complementary and engaged with axial fifth splines 77 carried on the periphery of the thrust ring 69 as well as with the second splines 68 on the periphery of the detent ring 66. The third, fourth and fifth splines 71, 73, 77, respectively, comprise an operative connection between the first splines 11 on the shaft 7 and the second splines 68 carried by the detent ring 66, the results being substantially the same as those achieved by the arrangement of FIG. 1 where the second splines 37' of the detent ring 37 directly engage the first splines 11 on the shaft 7.

The present invention thus provides a brake actuator of the type including a hydraulically operable piston and an adjuster nut on a threaded shaft, the adjuster nut being retained against possible movement, i.e. adjustment, due to vibration and/or shock, and the piston 1 being positively returned to its original position on release of the service brake.

I claim:

1. A brake actuator for a brake pad comprising a hollow piston which is axially slidably located in a cylinder with an elongate shaft extending axially through said cylinder and said hollow piston, said shaft being fixed in position within the cylinder and carrying a spiral thread, an adjuster nut being rotatably mounted on said spiral thread and being engaged by detent means mounted on said shaft, said detent means being spring biassed against the adjuster nut by a spring which engages said piston, said detent means normally restraining said nut from rotating relative to said shaft, and a thrust ring surrounding said shaft and being axially movable by said piston relative to said shaft to engage said adjuster nut indendently of said detent means and effect rotation of said nut against the restraint of said detent means when the axial movement of said piston exceeds a predetermined amount in response to pad wear, and axially extending spline means cooperating with said detent means and said shaft to prevent said detent means from rotating relative to said shaft during axial movement of said piston.

2. A brake actuator according to claim 1, wherein said detent means is in the form of a ring having sloping teeth which interengage with similar teeth on the adjuster nut, and said spline means comprise axially extending splines carried by said shaft and on which said detent is mounted.

3. A brake actuator according to claim 2, wherein the detent ring has an outer periphery, and said spline means include axial splines carried on said outer periphery of said detent ring, and complementary axial splines in the inside surface of the thrust ring interengaged with said axial splines on said detent ring.

4. A brake actuator according to claim 3, wherein said spline means include, in addition, axial splines carried on the outer periphery of said thrust ring, and complementary axial splines on the inside wall of the hollow piston interengaged with said axial splines on said thrust ring.

5. A brake actuator according to claim 1, wherein the thrust ring is engageable with the adjuster nut at a location radially outwardly of the location at which the detent means engages with said adjuster nut.

6. A brake actuator according to claim 5, wherein the thrust ring carries a thrust bearing which can engage the adjuster nut.

7. A brake actuator according to claim 1, wherein the adjuster nut engages a shoulder which projects inwardly of the piston, when the actuator is in a normal adjusted, brakes-off condition.

8. A brake actuator according to claim 7, wherein the adjuster nut has a frusto-conical surface on its periphery, which surface can engage a complementary clutch surface on said shoulder.

9. A brake actuator according to claim 1, wherein the said spring is not strong enough to rotate the adjuster nut on the spiral thread.

10. A brake actuator according to claim 1, wherein the said cylinder is formed within a further piston, the cylinder being closed at one end and open at the other.

11. A brake actuator according to claim 10, wherein said further piston is axially movable within limits by a pushing or auxiliary brake mechanism.

12. A brake actuator according to claim 1, wherein an axially movable tube extends through an axial bore in the outer end of said hollow piston to seal the interior of said hollow piston, said tube being axially movable to wind the adjuster nut and detent means back along the shaft against the spring bias.

13. A brake actuator according to claim 12, wherein a spreader plate is resiliently mounted on the tube between said hollow piston and a friction pad.

14. A brake actuator for a brake pad comprising a hollow piston which is axially slidably located in a cylinder with an elongate shaft extending axially through said cylinder and said hollow piston, said shaft being fixed in position within the cylinder and carrying a spiral thread, an adjuster nut rotatably mounted on said spiral thread and being engaged by detent means, spring means biasing said detent means against said adjuster nut, said detent means normally restrainiing said nut from rotating relative to said shaft, and a thrust ring surrounding said shaft and being axially movable by said piston relative to said shaft to engage said adjuster nut independently of said detent means and effect rotation of said nut against the restraint of said detent means when the axial movement of said piston exceeds a predetermined amount in response to pad wear, and axially extending spline means cooperating with said detent means and said shaft to prevent said detent means from rotating relative to said shaft during axial movement of said piston.

15. A brake actuator according to claim 14, wherein said detent means is in the form of a ring surrounding said shaft and having sloping teeth which interengage with similar teeth on the adjuster nut, and said spline means include axially extending first splines carried by said shaft having an operative connection with second splines carried by said detent means.

16. A brake actuator according to claim 15 including third splines on the inside surface of said thrust ring complementary and interengaged with the axially extending first splines carried by said shaft, axial fourth splines on the inside wall of said hollow piston, said second splines carried by said detent means being complementary and interengaged with said fourth splines, and axial fifth splines carried on the periphery of said thrust ring and being complementary and interengaged with said fourth splines, said third, fourth and fifth splines comprising said operative connection between said first splines carried by said shaft and said second splines carried by said detent means.

17. A brake actuator according to claim 14, wherein the thrust ring is engageable with the adjuster nut at a location radially inwardly of the location at which the detent means engages with said adjuster nut.

18. A brake actuator according to claim 14, wherein the thrust ring is engageable with the adjuster nut at a location radially outwardly of the location at which the detent means engages with said adjuster nut.

19. A brake actuator according to claim 14, wherein the adjuster nut engages a shoulder which projects inwardly of the piston, when the actuator is in a normal adjusted, brakesoff condition.

20. A brake actuator according to claim 19, wherein the adjuster nut has a frusto-conical surface on its periphery, which surface can engage a complementary clutch surface on said shoulder.

21. A brake actuator according to claim 14, wherein the said spring is not strong enough to rotate the adjuster nut on the spiral thread.

22. A brake actuator according to claim 14, wherein the said cylinder is formed within a further piston, the cylinder being closed at one end and open at the other.

23. A brake actuator according to claim 22, wherein said further piston is axially movable within limits by a pushing or auxiliary brake mechanism.

24. A brake actuator according to claim 14, wherein an axially movable tube extends through an axial bore in the outer end of said hollow piston to seal the interior of said hollow piston, said tube being axially movable to wind the adjuster nut and detent means back along the shaft against the spring bias.

25. A brake actuator according to claim 24, wherein a spreader plate is resiliently mounted on the tube between said hollow piston and a friction pad.

* * * * *